United States Patent

[11] 3,573,433

[72] Inventor Thomas J. Harris
Poughkeepsie, N.Y.
[21] Appl. No. 697,710
[22] Filed Jan. 15, 1968
[45] Patented Apr. 6, 1971
[73] Assignee International Business Machines Corporation
Armonk, N.Y.

[54] OPTICAL READ-ONLY MEMORY
8 Claims, 4 Drawing Figs.

[52] U.S. Cl. .......... 235/61.11, 340/173
[51] Int. Cl. .......... G06k 9/04, G11b 7/08
[50] Field of Search .......... 235/61.11, 61.115; 340/173 (LM):173 (LSS), 173 (Light); 250/219

[56] References Cited
UNITED STATES PATENTS

| | | | |
|---|---|---|---|
| 3,191,157 | 6/1965 | Parker et al. .......... | 340/173 |
| 3,371,324 | 2/1968 | Sinoto .......... | 235/61.11X |
| 3,440,620 | 4/1969 | French .......... | 340/173 |
| 3,460,099 | 8/1969 | Fredkin .......... | 235/61.11X |

*Primary Examiner*—Daryl W. Cook
*Attorney*—Sughrue, Rothwell, Mion, Zinn & MacPeak

ABSTRACT: An optical read-only memory system for reading binary information from a film with transparent locations indicating bits. A plurality of lens systems are provided to successively divide the binary information from the film into smaller and more easily handled units of information. The system is adapted to be used also as an associative memory unit. Frequency modulation systems are provided for use of the system as a parallel operated associative memory. Frequency modulation is also used to reduce the number of light sources and photosensitive elements required.

2 Sheets-Sheet 1

INVENTOR
THOMAS J. HARRIS
By Sughrue, Rothwell, Mion, Zinn & Macpeak
ATTORNEYS

OPTICAL READ-ONLY MEMORY

CROSS REFERENCES TO RELATED APPLICATIONS

The copending application of Thomas J. Harris and Harold Fleisher entitled "Very High Capacity Optical Memory System" filed Jan. 15, 1968, Ser. No. 697,709, discloses a memory system using a light deflector to direct a linearly polarized laser beam to illuminate the various fields of the memory.

BACKGROUND OF THE INVENTION

Various systems are described in the prior art for using multiple lens systems for coincident display of information. However, the specification describes a novel optical system for reading out binary information with a plurality of light sources and a plurality of photosensitive elements.

SUMMARY OF THE INVENTION

It is an object of this invention to provide a readout system for an optical memory providing random access to any word in a very short time interval.

It is a further object of this invention to provide an associative type readout system for an optical memory.

It is a further object of this invention to provide a system in which the optical memory can be updated in a short interval of time.

It is a further object of this invention to provide a low cost optical memory system for readout of binary information.

It is a further object of this invention to provide a system for the optical readout of a memory, which system reduces the number of light-emitting elements and photosensitive elements to an economically reasonable number.

DESCRIPTION OF THE PREFERRED EMBODIMENTS

Figures 1, 4:
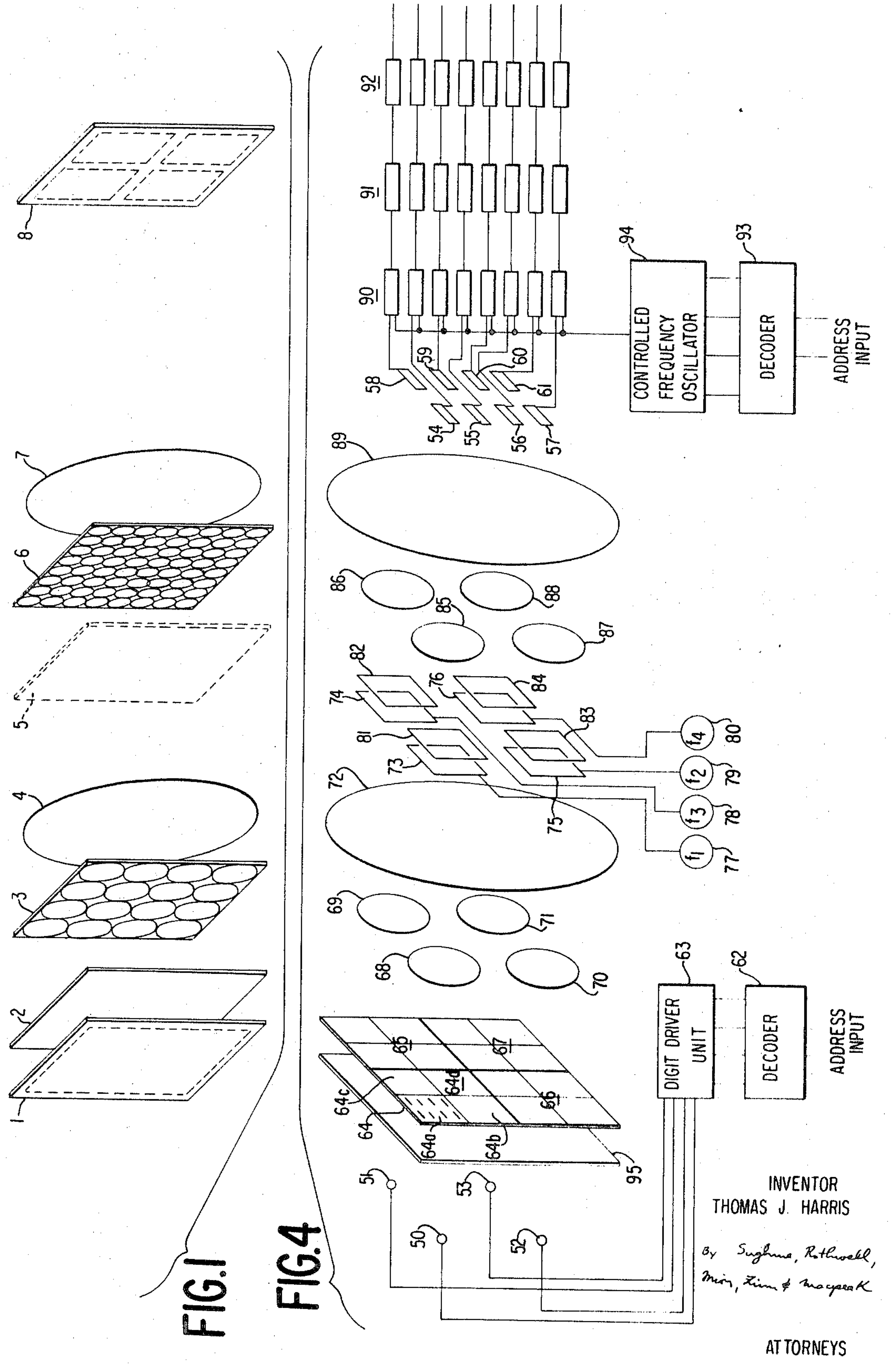
FIG. 1 illustrates an optical high-speed read-only memory system embodying the present invention.
FIG. 4 illustrates an embodiment of the invention designed to be built at reduced cost by using optical AND gates to reduce the necessary number of light-emitting elements and photosensitive elements.

FIG. 1 illustrates an optical high-speed read-only memory system according to the present invention. Plane 1 contains an array of light-emitting diodes. In the preferred embodiment, this array consists of 32×32 light-emitting GaAs diodes. A memory plane 2 is located in close proximity to plane 1. Plane 2 contains an array of memory blocks. In the preferred embodiment, this array contains 64×64 memory blocks, each block consisting of 8×9 bits on photographic film. Thus, in the preferred embodiment, the total memory capacity would be 294,912 bits.

Each light diode illuminates an array of memory blocks. In the preferred embodiment each light diode illuminates 2×2 memory blocks. A diffusing plate may be inserted between 1 and 2 to aid in the appropriate illumination of the memory blocks. Lens array 3 is associated with the illuminated area of plate 2 to magnify the illuminated area and to project the magnified illuminated area on to image plane 5. This magnification and projection is done in conjunction with lens 4. In the preferred embodiment lens array 3 consists of 4×4 lenses. Because there are 32×32 diodes in plane 1 and only 4×4 lenses in plane 3, the projected image fills only ⅛×⅛ of plane 5.

The light from image plane 5 is received by the lenses in lens array 6, passed through lens 7 and focused on image plane 8. Each lens of lens array 6 receives the light from one illuminated area of the image on image plane 5 and focuses, with the aid of lens 7, this light on image plane 8. Because there are 8×8 potentially illuminated areas on image plane 5 in the preferred embodiment, there are 8×8 lenses in lens array 6. Each potentially illuminated area contains 2×2 memory blocks, and these 2×2 memory blocks are focused on image plane 8. The lens arrays are so arranged that any 2×2 memory block area which is illuminated on memory plane 2 will be focused on image plane 8. Because only one 2×2 memory block area will be illuminated at any one time, only one such area will appear on image plane 8 at any one time. Image plane 8 contains a light-sensitive diode array consisting, in the preferred embodiment, of four groups of 8×9 diodes. Thus, the illumination of one GaAs diode in plane 1 causes the illumination of four groups of 72 light-sensitive diodes in image plane 8. The proper group of 8×9 (or 72 total) diodes is electrically gated to readout the selected group of 72 bits for the processing period.

The entire system, as illustrated in FIG. 1, is passive except for the light-emitting diodes and light-detecting diodes. The information contained in memory plane 2 can be updated with a camera used offline. An unexposed film on glass in a frame is placed under a master information mask with and without holes in appropriate bit positions. The information can be updated by closing or opening holes in the master information mask in the 72 bit fields (or words) to be updated. The film is processed, and the frame is inserted into the read system as a new memory plane 2. Proper registration of the frames on the memory plane is done in the camera.

The registration between the camera and the read station can be achieved by placing an unexposed film in the read station, substituting a mask with registration marks in place of diode array 8, and then making an exposure. The exposed film is then placed in the camera, and the master information mask is registered with the registration marks on the film. All information masks made with this camera and the frame used for initial registration will be automatically registered when inserted in the read station.

Figure 2:
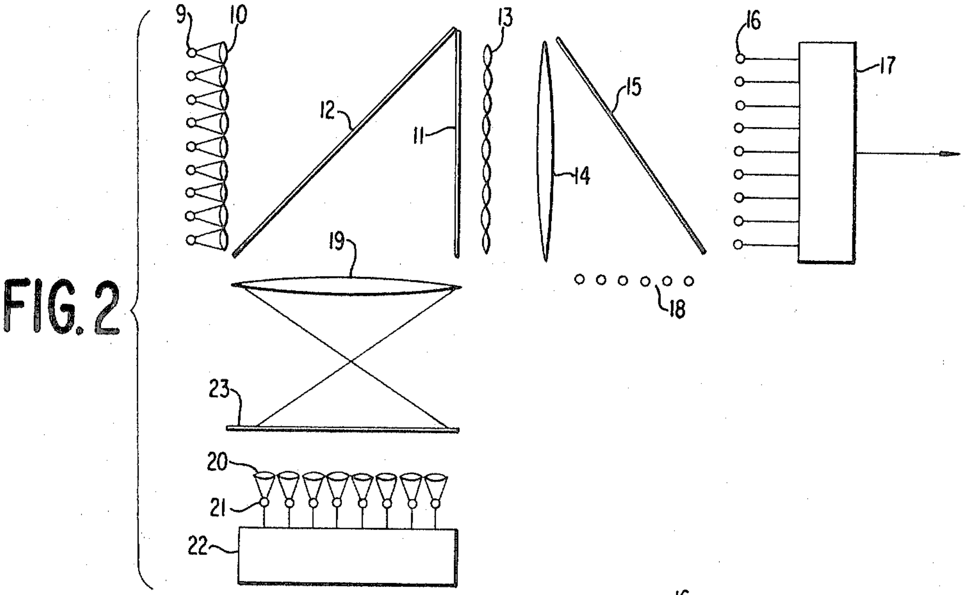
FIG. 2 illustrates an optical associative memory system embodying the present invention.

FIG. 2 illustrates an optical associative memory system, embodying the present invention. In a nonassociative mode, the system operates similar to the memory system described in FIG. 1. A light-emitting diode in a diode array 9 corresponding to the memory block to be readout is operated, and its associated lens in a lens array 10 collimates the light and illuminates only the selected memory block in a memory plane 11. The light to illuminate memory plane 11 is passed from lens array 10 directly through a beam splitter 12 onto memory plane 11. Light passed by the transparent bits on the illuminated memory block in memory plane 11 is magnified by the lenses of a lens array 13 and a lens 14, and is passed directly through a beam splitter 15 onto a matrix 16 of photosensitive diodes. The output from the photodetecting diode array is processed through a logic unit 17 and the desired information is read out.

In the associative mode of operation of FIG. 2, one diode in a light-emitting diode array 18 is turned on. This diode represents one bit in the word which it is desired to locate in the memory plane. The light from array 18 is reflected from beam splitter 15, is passed by lens 14 and all of the lenses of lens array 13, and is imaged on all memory blocks of memory plane 11. Each memory block which contains the bit corresponding to the illuminated diode of diode matrix 18 will be transparent at a corresponding position in that memory block. Thus each memory block containing the bit will pass some light from the illuminated diode through the memory plane 11 onto beam splitter 12.

The light transmitted through memory plane 11 is reflected from beam splitter 12 and imaged by a lens 19 onto an image plane 23. A lens array 20, located on the other side of an image plane 23, contains one lens for each memory block. A given lens in lens array 20 collects all the light from its associated memory block image, and directs it to a photodetector in a light-sensitive diode array 21. If any memory block in memory array 11 contains the bit corresponding to the light-emitting diode in diode array 18, there will be an output from the photosensitive diode in diode array 21 which corresponds to the memory block containing that bit. If not, there will not be an output.

An associative memory is ordinarily used to locate memory blocks containing a plurality of appropriate bits, rather than one appropriate bit. The system of FIG. 2 is used to determine the presence of this plurality of appropriate bits by determining the presence of individual appropriate bits in serial order. The outputs from diodes in diode array 21 are fed to a logic unit 22 which gates the diode outputs so that all OFF diodes are not interrogated when the next one of the plurality of appropriate light-emitting diodes from diode array 18 is illuminated. The process of illuminating appropriate diodes in array 18 and reading out the information from diode array 21 is repeated serially until the memory block or blocks containing the desired information are stored in the logic The address of each of these blocks is then readout for further processing. Thus, FIG. 2 operates in a serial interrogation mode.

Figure 3:
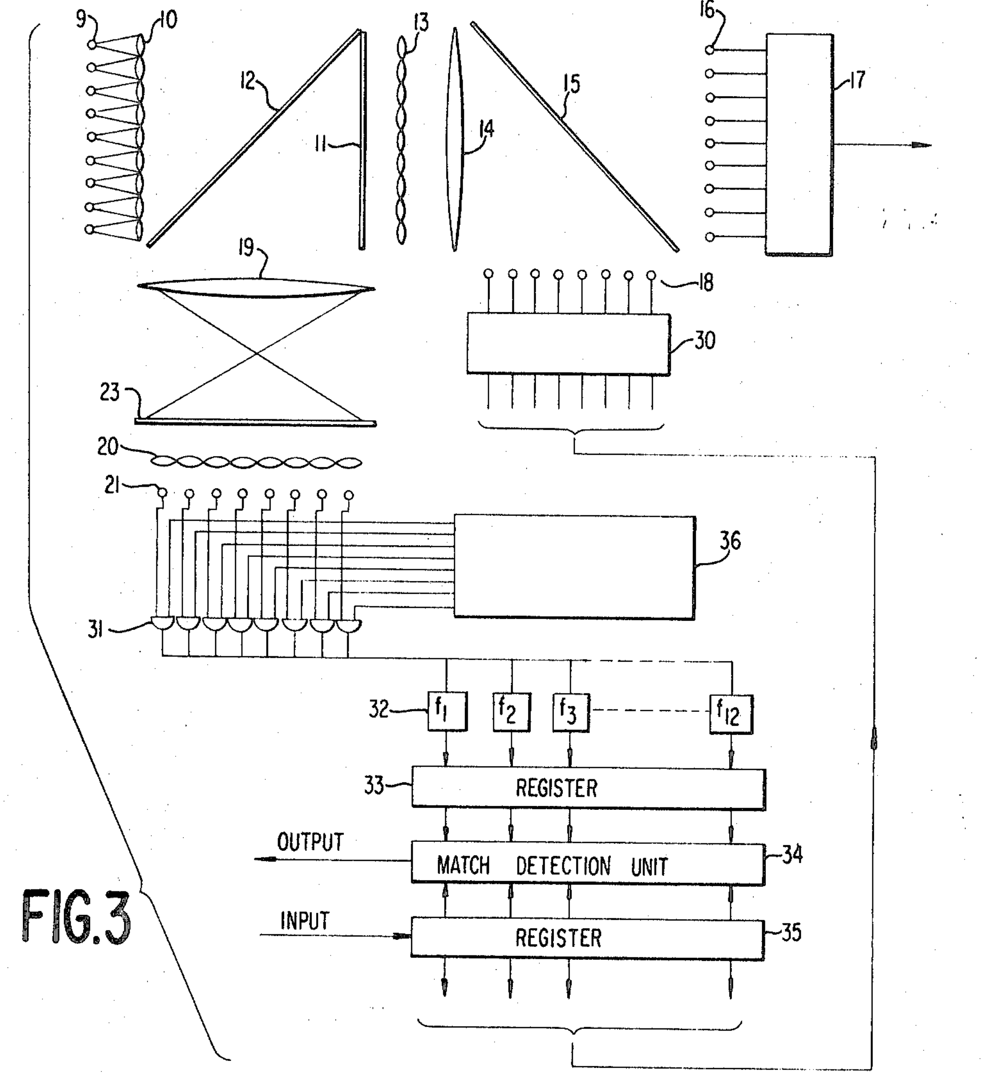
FIG. 3 illustrates an optical associative memory, using the basic system of FIG. 2, but arranged to operate in a parallel interrogation mode.

FIG. 3 shows an optical associative memory, using the basic system of FIG. 2, but arranged to operate in a parallel interrogation mode. Elements 9 through 23 have similar structure and function to the correspondingly numbered elements in FIG. 2. The primary distinction of FIG. 3 over FIG. 2 is that all of the light-emitting diodes in diode array 18 which correspond to bits to be located are turned ON at once. This simultaneous ON condition is accomplished by modulating the light of the diodes in array 18 at different frequencies, under the control of a modulating frequency driver unit 30. Thus, a different frequency will be associated with each memory bit in the field. In the preferred embodiment, in which there are 72 memory bits per field, there will be 72 different frequencies at which the light-emitting diodes will be driven. Of course, in ordinary usage, all 72 frequencies will not be simultaneously used. Only those frequencies corresponding to memory bits to be located will be used at any one time. The frequencies to be used are controlled by a register 35, which receives an input signal representing the bits to be searched for and produces a corresponding output signal to control a memory block selector 36.

The outputs from photodetecting diodes in diode array 21 are fed through an array of AND gates 31. These AND gates are controlled by the output of memory block selector 36 which successively opens the AND gates corresponding to the memory fields, so that each of the memory fields can be interrogated in turn. Upon the opening of an AND gate corresponding to any given field, the various frequencies received by the photodetecting diode corresponding to that field are fed to an array of filters 32. This filter array contains a filter tuned to each of the modulating frequencies and produces outputs to determine which of the modulating frequencies are being received by the particular photodetecting diode which is gated open.

A register 33 records the frequencies being received. A match detection unit 34 compares the signals received from register 33 with the signals received from register 35 to determine whether or not all the frequencies necessary for a complete match are being received for the particular memory field being interrogated. The output of register 35 also controls modulating frequency driver 30 to modulate the light-emitting diodes at the appropriate frequencies. The bits to be searched are entered into register 35 an an input condition. A match output condition is received at the output of match detecting unit 34 and is an indication of whether the particular memory block than selected by memory block selector 36 is a memory block which satisfies the conditions set into register 35.

Light-emitting diode array 18 and light-detecting diode array 21 in FIGS. 2 and 3 can be eliminated, as it is possible to also use the light-emitting diodes as light-detecting diodes. This modification can be accomplished by forward biasing the diodes for emission and back biasing the same diodes for use as photodetectors. The appropriate logic units would then be gated into the two diode arrays so that the diodes could be used either as light-emitting diodes or light-detecting diodes for the two functions of the circuit.

The total capacity of the type of high-speed optical memory described in FIG. 1 can be obtained from the product of the number of light sources and the number of light detectors. For example, in the preferred embodiment of FIG. 1, there are 1024 (32×32) light-emitting diode sources and 288 (16×18) light detectors for a total capacity of 294,912 bits.

The cost of this type of system is roughly proportional to the sum of light sources and light detectors. In a large capacity memory of say $64\times10^6$ bits, having a 32×32 light detector array, approximately 64,000 light detectors would be required.

FIG. 4 describes a system for reducing the number of light-emitting diodes so that the cost of a large optical memory system can be reduced to practical values. The illustrated embodiment has four light sources 50 through 53 and eight light detectors 54 through 61. Each light source, when turned ON, illuminates four 8-bit blocks. For example, light source 50 illuminates blocks *64a*, *64b*, *64c* and *64d*. Block *64a* illustrates the possible position of eight bits of information in that block. A lens system containing lenses 68 through 72 focuses the blocks from the illuminated group of blocks onto electrical AND gates comprising elements 73 through 76 and 81 through 84. For example, if light-emitting diode 50 is on, block *64a* will be imaged onto the AND gate comprising elements 73 and 81, block *64b* will be imaged on the AND gate comprising elements 75 and 83, and block *64c* will be imaged on the AND gate comprising elements 74 and 82, and block *64d* will be imaged on the AND gate comprising elements 76 and 84.

Each AND gate comprises a light polarizer, an electro-optical crystal capable, when charged electrically, of changing the polarization of the incoming light polarized by a polarizer 95 and an analyzer positioned in the path of the light passing through the crystal and oriented to block light linearly polarized in the original direction. Consequently, light passing through an uncharged crystal is blocked by the analyzer but light passing through a charged crystal has its polarization direction changed so that a portion of the light beam passes through the analyzer to provide an optical output signal indicating the coincidence of a light beam with a charging signal on the electro-optical crystal.

A plurality of separate, distinct frequencies are provided by frequency sources 77 through 80. The electrical signals from these frequency sources are fed to individual ones of the electro-optical crystals 73 through 76 to cause a change in the polarization of incoming polarized light. The light passes through these electro-optical crystals and to individual ones of the analyzers 80 through 84. Only light which changed polarization state in passing through the crystals will pass through the analyzers. Lens system 85 through 89 images this light onto an array of photosensitive elements 54 through 61. Because there are four blocks *64a* through *64d* of information in field 64, there are four coincident arrays of information focused on the array of photosensitive elements 54 through 61. However, each of these arrays of information is modulated with a different frequency because of the different frequencies generated by elements 77 through 80.

An address input is provided to a decoder 93 to indicate which of the four blocks of information in the field contains the desired information. An output from the decoder is applied to a controlled frequency oscillator 94 to generate one of four controlled frequencies for application to one input of each of the frequency mixers in mixer block 90. An electrical signal from the output of photosensitive elements 54 through 61 is applied to the other input of each of the mixers in mixer block 90. An output from each of these mixers is fed to each of the filters in filter block 91. These filters are tuned to appropriate sideband frequencies to indicate the receipt of the appropriate sideband from the mixer which feeds the filter. The outputs from the filters are applied to electrical detectors in detector unit 92 to indicate the presence of the appropriate bit on the array of photosensitive detectors at the appropriate frequency. Binary information is obtained from the output of these detectors in detector unit 92.

This technique, known as a heterodyne technique, reduces the number of light sources by a factor equal to the number of frequencies used. If sixteen frequencies are used (requiring 4×4 array of electro-optical modulators), the number of light emitters required is reduced by a factor of 16.

While the invention has been particularly shown and described in reference to preferred embodiments thereof, it will be understood by those skilled in the art that the foregoing and other changes in form and details may be made therein without departing from the spirit and scope of the invention.

I claim:

1. Apparatus for reading information from an optical information plane in bit form, said plane being divisible into information bearing blocks arranged in a first pattern, each of said blocks containing areas arranged in a second pattern, each of said areas bearing optical information, said apparatus comprising:

a. a first array of individually controlled light sources arranged in said first pattern, each of said light sources being arranged to illuminate only a correspondingly positioned group of said blocks, wherein a group comprises less than the total number of blocks;

b. a second array of detector elements arranged in said second pattern; and c. a lens system for receiving light from any illuminated information bearing block and for imaging said light on said array of detector elements so that the light from each of said areas in said illuminated block falls on the correspondingly positioned detector element.

2. Apparatus according to claim 1 further comprising:

a. a third array of individually controlled light sources arranged in said second pattern, each of said light sources being arranged to illuminate correspondingly positioned ones of said areas in each of said blocks; and b. a fourth array of photosensitive elements arranged in said first pattern and positioned to be illuminated by light from said third array of light sources in said second pattern, such that, if any of said blocks is illuminated, the corresponding element of said fourth array of said photosensitive elements in said first pattern is illuminated.

3. Apparatus according to claim 2 further comprising:

a. a plurality of electrical signal sources for producing corresponding signals each having a different characteristic parameter;

b. means responsive to said plurality of electrical signals for modulating the light output of said individually controlled light sources in said third array; and c. means for scanning the outputs of said photosensitive elements in said fourth array to determine the said characteristic parameter of the signal received by each of said photosensitive elements.

4. Apparatus according to claim 3 wherein said characteristic parameter is frequency.

5. Apparatus according to claim 1 wherein:

a. each of said blocks of said plane contains a number of specimens of said second pattern of information bearing areas, said specimens being arranged in a third pattern, and further comprising;

b. an array of optical gates arranged in said third pattern, adapted to be controlled by a corresponding number of electrical control signals and arranged so that each gate can receive light from the corresponding one of said specimens;

c. means for generating a plurality of electrical signals of a corresponding plurality of frequencies and for applying said plurality of electrical signals to said array of optical gates as said electrical control signals;

d. said lens system being adapted to apply the output of said array of optical gates to said second array of photosensitive elements to produce electrical output signals from said photosensitive elements; and e. filter means for producing an output indication of the frequencies present in said electrical output signals.

6. Apparatus according to claim 1 wherein said individually controlled light sources and said detector elements comprise diodes which are light emitters when forward biased and are light detectors when back biased.

7. An optical associative memory for reading information from an optical information plane in bit form, said plane being dividable into information bearing blocks arranged in a first pattern, each of said blocks containing areas arranged in a second pattern, each of said areas bearing optical information indicated by its opaque or nonopaque condition, said apparatus comprising:

a. an array of individually controlled light sources arranged in said second pattern, each of said light sources being arranged to illuminate all of the correspondingly positioned ones of said areas;

b. an array of photosensitive elements arranged in said first pattern; and c. a lens system for receiving light from any illuminated information bearing area and for focusing said light on said array of photosensitive elements so that the light from each of said blocks having said area illuminated falls on the correspondingly positioned photosensitive element.

8. The apparatus of claim 7 wherein the diodes in said second array are forward biased to emit light which illuminated correspondingly positioned ones of said areas in each of said blocks, and the diodes in said first array are back biased to act as light detectors which are arranged in said first pattern and positioned to be illuminated by light from said second array, such that if any of said blocks is illuminated the corresponding diode in said first array is illuminated.